US009118806B2

(12) United States Patent
Bright-Thomas

(10) Patent No.: US 9,118,806 B2
(45) Date of Patent: *Aug. 25, 2015

(54) DEVICE AND METHOD FOR MULTISTREAM BANDWIDTH CONTROL IN VIDEOCONFERENCING

(71) Applicant: CISCO TECHNOLOGY, INC., San Jose, CA (US)

(72) Inventor: Paul Bright-Thomas, Slough (GB)

(73) Assignee: Cisco Technology, Inc., San Jose, CA (US)

(*) Notice: Subject to any disclaimer, the term of this patent is extended or adjusted under 35 U.S.C. 154(b) by 132 days.

This patent is subject to a terminal disclaimer.

(21) Appl. No.: 13/760,736

(22) Filed: Feb. 6, 2013

(65) Prior Publication Data

US 2014/0218465 A1   Aug. 7, 2014

(51) Int. Cl.
*H04N 7/14* (2006.01)
*H04N 7/15* (2006.01)

(52) U.S. Cl.
CPC .................................. *H04N 7/152* (2013.01)

(58) Field of Classification Search
None
See application file for complete search history.

(56) References Cited

U.S. PATENT DOCUMENTS

| 6,300,973 | B1* | 10/2001 | Feder et al. ............... 348/14.09 |
| 6,909,726 | B1 | 6/2005 | Sheeran |
| 7,324,552 | B1 | 1/2008 | Galand et al. |
| 8,107,540 | B2 | 1/2012 | Mohandas |
| 8,125,901 | B2 | 2/2012 | Appleby et al. |
| 2001/0024239 | A1* | 9/2001 | Feder et al. ............... 348/423.1 |
| 2007/0276933 | A1* | 11/2007 | Lee et al. ...................... 709/223 |
| 2013/0195188 | A1* | 8/2013 | Sugio et al. ............. 375/240.14 |

OTHER PUBLICATIONS

U.S. Appl. No. 13/733,718, filed Jan. 3, 2013, Bebbington, et al.

* cited by examiner

*Primary Examiner* — Maria El-Zoobi
(74) *Attorney, Agent, or Firm* — Lempis Summerfield & Katz LLC

(57) ABSTRACT

In one embodiment, an apparatus includes a memory that stores executable instructions and a processor that executes the instructions. The processor may determine, for plural received compressed video inputs received from one or more endpoints in a video conference, at least one motion vector included in each of the plural compressed video inputs. The processor may calculate, based on the determined motion vectors, a motion value corresponding to each of the plural compressed video inputs, the motion values representing a level of motion over several frames for each of the plural compressed video inputs. The processor may allocate, based on the calculated motion values, bandwidth to the one or more endpoints in the video conference.

15 Claims, 5 Drawing Sheets

DEVICE AND METHOD FOR MULTISTREAM BANDWIDTH CONTROL IN VIDEOCONFERENCING

TECHNICAL FIELD

The present disclosure relates generally to bandwidth allocation for video streams sent between common network locations.

BACKGROUND

A video conference system allows endpoints at two or more locations to communicate simultaneously by two-way video and audio transmission. Typically, powerful computer processors are used to employ video compression to reduce the amount of channel bits needed to be transmitted between endpoints. Simultaneous video conferencing among three or more remote points is made possible by way of a Multi-point Control Unit (MCU), which bridges interconnect calls from several sources.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF EXAMPLE EMBODIMENTS

Overview

An apparatus according to the present disclosure includes a memory that stores executable instructions and a processor that executes the instructions. The processor may determine, for plural received compressed video inputs received from one or more endpoints in a video conference, at least one motion vector included in each of the plural compressed video inputs. The processor may calculate, based on the determined motion vectors, a motion value corresponding to each of the plural compressed video inputs, the motion values representing a level of motion over several frames for each of the plural compressed video inputs. The processor may allocate, based on the calculated motion values, bandwidth to the one or more endpoints in the video conference.

Detailed Description

Figure 1:
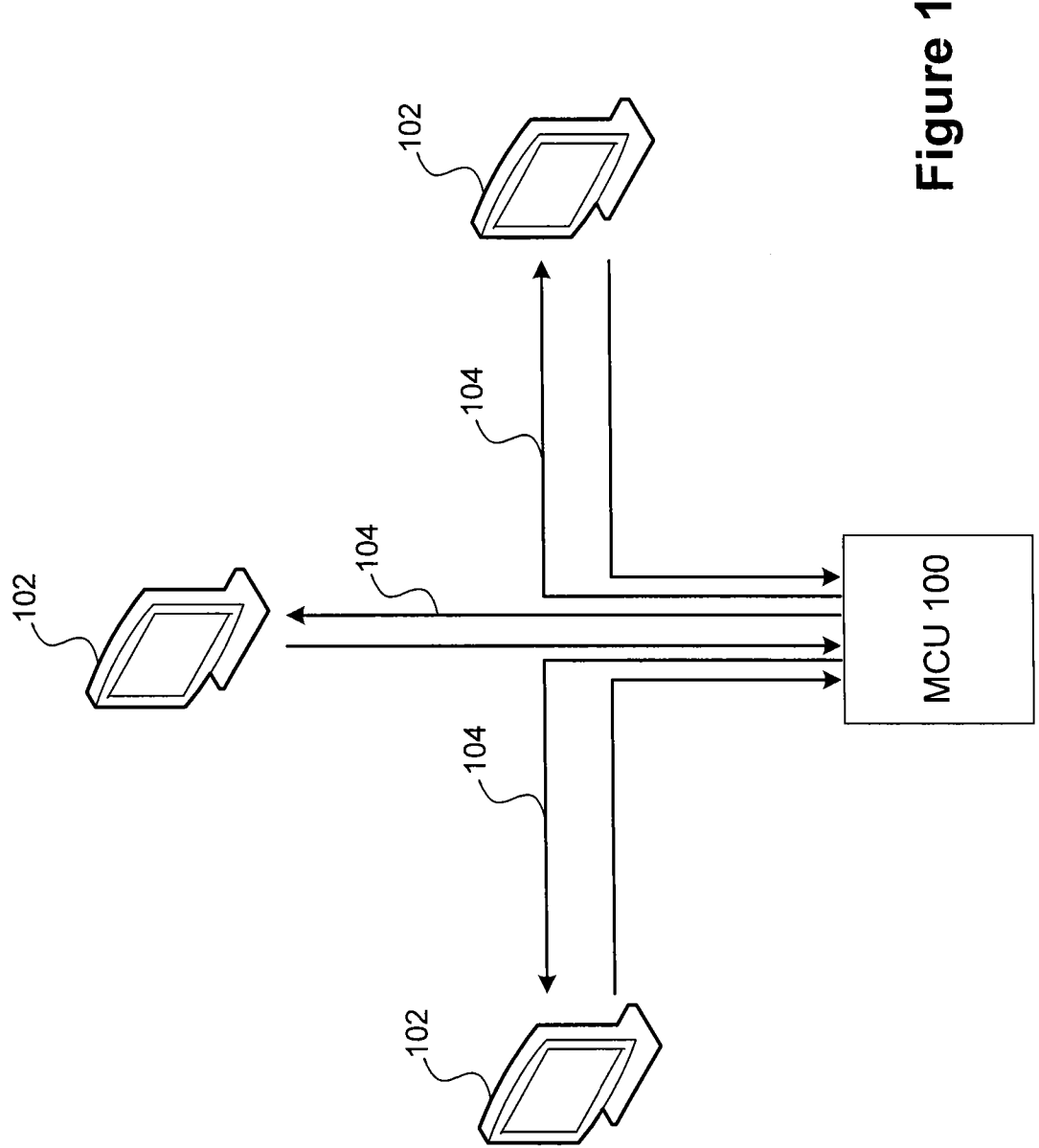
FIG. 1 illustrates an exemplary multipoint video conferencing network.

FIG. 1 illustrates an exemplary multipoint video conferencing network that includes an MCU 100 and a plurality of endpoints 102. In this exemplary network, the multipoint MCU 100 mixes audio and video streams from each endpoint 102 and transmits a single audio and video stream back to each endpoint 102 in the multipoint video conference. In the case that multiple displays or speakers exist at an endpoint 102, multiple video and audio streams may be sent by the MCU 100 to that endpoint over a common transmission path 104. Further, the MCU 100 may send multiple video and audio streams to an endpoint for simultaneous display at any endpoint 102 over the common transmission path 104. If audio or video transcoding or transrating are required, the MCU 100 may decode and re-encode the audio or video streams transmitted to each endpoint 102.

When exploiting the high resolutions of which video conferencing endpoints and infrastructure are now capable, the bandwidth costs of operation can be prohibitive. As noted above for FIG. 1, multiple video streams may be sent between common network source/destination pairs. These situations include: conferencing between multi-screen endpoints, and between a multi-screen telepresence endpoint and a multipoint telepresence conferencing unit; multiple intra-conference cascade links between a pair of multipoint telepresence conferencing units; and multiple video streams between a multipoint telepresence conferencing unit and a multi-stream capable endpoint.

Where multiple video streams are known to be using a common network path, as in the common transmission path 104 of FIG. 1, the aggregate bandwidth used on this common path by these streams can be lowered by a coordinated bitrate management strategy. Under such a bitrate management strategy, the MCU 100 may distribute a multi-stream bandwidth allocation unevenly amongst a number of streams sent over the common transmission path 104, while dynamically adjusting the bandwidth distribution as the scene content of each stream evolves. At any point in time, streams with more challenging content could be given a greater share of the multi-stream bandwidth budget, and streams with simpler content would receive a lesser share. This would allow the less-demanding streams to operate at a lower bandwidth than the maximum value assigned to that stream, while the more demanding streams receive the specified maximum bitrate.

Overall, the aggregate bandwidth across a mixed set of streams can be reduced relative to the sum of individual maximum bitrates, with each stream receiving adequate bitrate at the more demanding times. While demand may be determined by measuring the objective quality of a video stream, such as by evaluating peak signal-to-noise ratio (PSNR), these methods can be computationally intensive, thereby requiring higher processing capacity and increasing system cost.

As an alternative, and as a non-limiting example, the bitrate management strategy of the present disclosure may be executed by quantifying video streams in terms of their motion content. For instance, the MCU 100 may receive a maximum negotiated bandwidth from the endpoints 102, and manage outgoing stream bandwidth allocation within those boundaries based on motion characteristics in each steam's content. To this end, motion vectors may be extracted from a video input that was encoded at one of the endpoints 102, and the extracted motion vectors can be used to calculate an overall motion value that quantifies the motion activity in each respective endpoint steam's content. In such a case, the MCU 100 may prioritize or rank streams based on the calculated overall motion value, and the bitrate management strategy executed by the MCU 100 can allocate a portion of the bandwidth nearest the maximum negotiated bandwidth limit to the most active endpoint stream. That is, the bitrates of streams encoded by video encoders at the endpoints 102 can be coordinated to remain within a defined limit of aggregate bandwidth at the MCU 100, while at the same time providing the maximum bitrate to the most complex streams at the expense the less complex streams, which receive a lower relative bitrate allocation.

An advantage of the present disclosure is that the total bandwidth usage by a telepresence infrastructure can be kept to a lower limit than the case where links manage their bitrates independent of one another. Further, if the aggregate bandwidth between network nodes in a video conference can be reduced, particularly for endpoints or infrastructure units that are widely distributed geographically, then cost of ownership for video conferencing endpoints and infrastructure can be reduced.

While the present disclosure implements the above-described coordinated bitrate management strategy at the MCU 100, the strategy is not limited to being executed by an MCU. For instance, the present disclosure can also be applied symmetrically to video streams in each direction of the video conference, thereby controlling the network bandwidth on network infrastructure common to traffic in both directions. Another important case relates to calls which terminate at each end at a MCU, as in MCU-MCU cascades. This case is becoming particularly relevant in new conferencing topologies where MCUs act as transcoding concentrators for local participants in a distributed conference, with a series of wide area network (WAN) cascade links carrying media between the sub-conferences. The provision of bandwidth on these wide-area links is a significant cost component of highly distributed video conferencing, and although the use of local MCUs linked by cascades does itself reduce the number of long-distance links in the conference, the bandwidth on these links can be further reduced by the multi-stream bitrate management of the present disclosure. A pair of MCUs may be cascading links for more than one conference, but an aggregate of streams across multiple conferences can be managed as a single set to control total point-to-point bandwidth.

Figure 2:
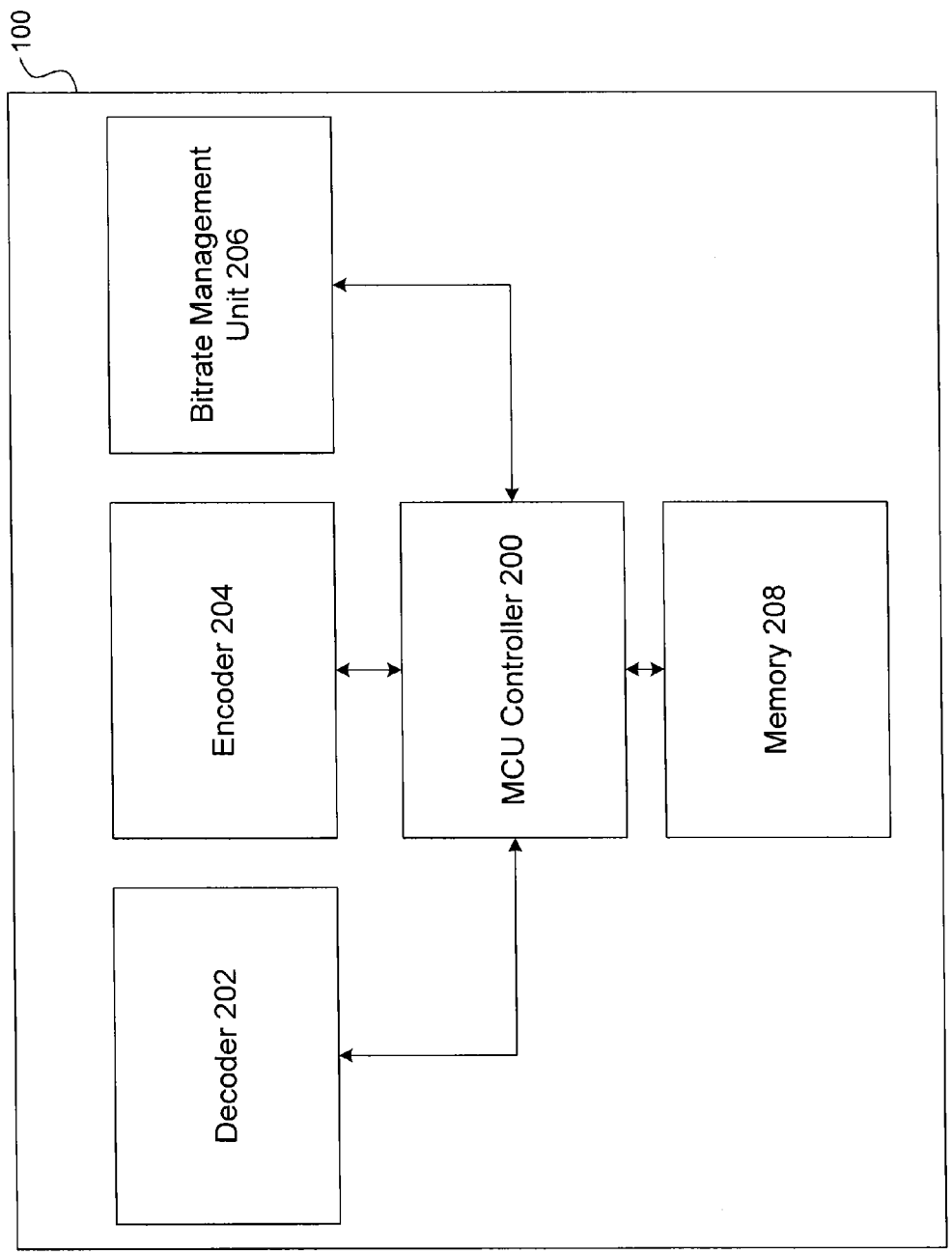
FIG. 2 illustrates and exemplary block diagram for a Multi-point Control Unit (MCU)

Next, FIG. 2 illustrates an exemplary block diagram for the MCU 100 of FIG. 1. As shown in FIG. 2, the exemplary MCU 100 includes an MCU controller 200, a decoder 202, an encoder 204, a bitrate management unit 206, and a memory 208.

The MCU controller 200 coordinates the functions of the various elements of the MCU 100. The MCU controller 200 may include one or more processors with which to perform the MCU 100 features described herein. Further, the MCU controller 200 may utilize the memory 208 to store instructions with which to execute these features. The memory 208 may include an MCU host application for executing the MCU 100 processing functions, and may also be used for temporary storage by the various MCU 100 elements.

Compressed video inputs received by the MCU 100 are decoded using the decoder 202. The decoding process may include a process of motion compensation in which a representation of objects in the current coded frame is derived from previously coded frames, where a small number of previously coded frames, known as reference frames, are available in the memory 208. Motion compensation operations may be performed by the decoder 202 at the level of a small square or rectangular block within a frame, where the motion compensation operation is parameterized by a motion vector. A motion vector consists of a reference to one of a list of available reference frames and a two-dimensional vector that provides an offset from coordinates of the current block in the current decoded frame to coordinates of a comparable block in the specified reference frame. Motion may be represented at multiple block sizes, as well as at the level of sub-macroblock partitions. A macroblock may contain up to 16 motion vectors. More motion vectors may be included if the prediction of any block is made by combining predictions from two separate reference frames (by standardized convention, this method of bi-prediction is not normally used in video conferencing).

The derivation of motion vectors by the decoder 202 may, e.g., occur during inter prediction processing of the video input. The motion vectors may be associated with one or more macroblocks in compressed video frame. Motion vectors may also be calculated by an endpoint encoder (i.e., an encoder included in any of the endpoints 102 of FIG. 1), in which case the calculated motion vectors are extracted by the decoder 202 following receipt of the video input from the endpoint.

Once the motion vectors are derived or extracted by the decoder 202, the MCU controller 200 calculates a motion value representing the overall level of motion for each video frame of the respective video steam inputs, the calculation being based on the derived/extracted motion vectors. Each frame of video (of which there are typically 30 or 60 per second) is broken into up to 8000 macroblocks, and each macroblock can have up to 16 motion vectors (1 is the norm, but more complex content may be coded with two, four, etc). Thus, there are many thousands of motion vectors for a given frame, and the process of calculating a motion value aggregates this information to provide a representative number for the degree of motion in the picture, thereby allowing frames, and ultimately streams, to be compared.

As a non-limiting example, the motion value may be calculated by summing the magnitude of motion vectors for each macroblock in a video frame. Where macroblocks have multiple motion vectors, then just one default motion vector can be chosen as representative. Alternatively, the magnitudes of motion vectors may be averaged across the macroblock, or the highest magnitude motion vector in the macroblock may be used in the motion value calculation. Where macroblocks are coded as "skip," the motion properties of the macroblock are not coded explicitly in the bitstream, but instead may be derived from neighboring macroblocks (e.g., those macroblocks immediately above and to the left), and the derived motion vector may be used. Motion vectors may refer to one of a set of reference frames, where each reference frame is a decoded frame from some point in the past relative to the frame currently being decoded. For motion of constant speed, the value of the motion vector will scale with the temporal distance from the current frame to the reference frame to which the motion vector refers, and the magnitude of motion may be downscaled by this temporal distance to remove the effect of the choice of reference frame from the apparent scale of motion.

Some block types included in the received endpoint stream may not contain motion vectors. In this case, the MCU controller 200 calculates a dummy value as the motion value. The dummy value is used for macroblocks that do not code motion, but instead make a prediction by a spatial extrapolation of the picture content of neighboring macroblocks—a mechanism known as intra prediction. This type of macroblock may be used for a variety of reasons, including prediction of objects that simply are not visible in prior decoded frames used as references for motion compensation, objects that are displaced by other than pure linear motion (including rotation either within or relative to the plane of the image, or magnification), objects that are deformed relative to previous representations, or objects that are lit differently in previous frames and so cannot be simply matched.

Once the motion value (dummy or otherwise) for a video frame in the video input has been calculated, the motion value may be scaled by the MCU controller 200 according to a video resolution of the video frame. This allows the motion of streams with different resolutions and/or from multiple endpoint participants to be normalized for comparison.

The bitrate management unit 206 executes a bitrate management strategy such that the MCU 100 can distribute a multi-stream bandwidth allocation based on the calculated motion values. As a non-limiting example of the bitrate management strategy, the bitrate management unit 206 determines a maximum negotiated bandwidth for the endpoints in the video conference. The bitrate management unit 206 can obtain the calculated motion values for each endpoint stream and rank the incoming streams based on the motion values. For instance, the streams can be prioritized by the bitrate management unit 206 from highest to lowest motion value. Based on the stream motion value rankings, the bitrate management unit 206 can allocate portions of the maximum negotiated bandwidth to the endpoints in a video conference. For example, the most "demanding" endpoint exhibiting the highest motion levels may receive a bandwidth allocation near the maximum bandwidth limit, while less demanding streams are allocated portions of the remaining bandwidth.

The bitrate management unit 206 may utilize a cost function to determine bandwidth allocations. The floor on usable bandwidth may be set by periods of higher motion in the scenes encoded, where a higher bandwidth is needed to maintain acceptable video quality. Within a video conferencing call, this is typically when a conference participant is particularly animated and is usually transient. The ceiling on allocated bandwidth may be set by encoding capabilities, but should also take into account available network bandwidth defined by the number of concurrent video conferencing streams that are to be supported. The bandwidth use for a video stream can be varied between these two limits during the course of a call, e.g., to trade off the video quality achieved against predetermined bitrate requirements, thereby maintaining a minimum quality for both static and dynamic periods during the call.

Figure 3:
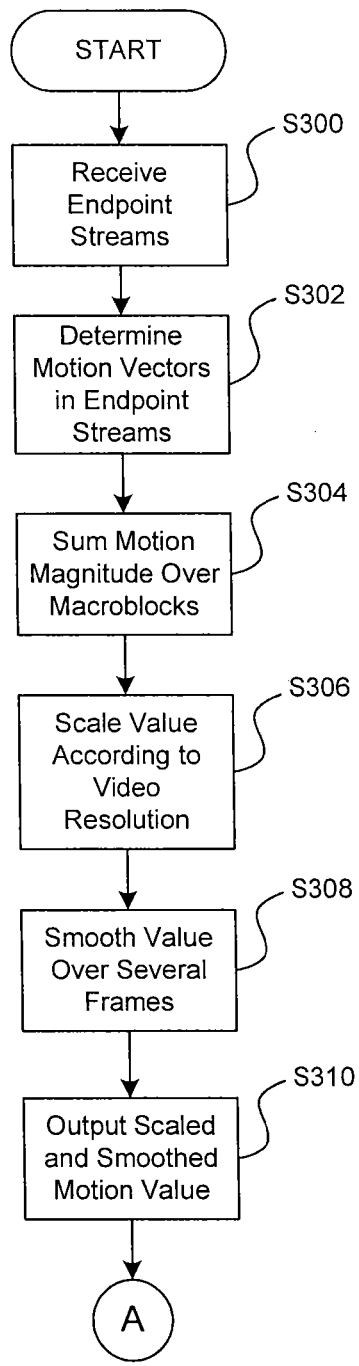
FIG. 3 illustrates an exemplary flowchart for processing compressed video using motion vectors.

Next, FIG. 3 illustrates an exemplary method of processing compressed video by MCU 100 using motion vectors in the compressed video to determine an overall motion value for a received video stream.

Referring to FIG. 3, the MCU 100 at step S300 receives a compressed video input from each of one or more participant endpoints. The compressed video may, e.g., be received from one or more participant endpoints in a video conference. Once the compressed video input is received, the MCU 100 determines one or more motion vectors in the compressed video at step S302. There will be many motion vectors (e.g., from 100 to 10,000 per frame) depending on resolution, although a variable number of motion vectors may be present even for frames of a fixed resolution. Some (or all) of these motion vectors may be zero if there is little motion in the present scene, in which case a dummy value may be used. The motion vectors are predetermined by the encoding process in the contributing endpoint, and the MCU 100 extracts the motion vectors according to the MCU's specified decoding process, as per the appropriate video compression standard. According to the present disclosure, the primary use of the motion vectors is for motion compensation and this process should coincide with that of the source encoder or the description of video will diverge, resulting in invalid video being displayed. The values of the motion vectors may also be used to derive a representative measure of motion in the present frame (i.e., the overall motion value), and may be combined with similar measures made in other frames to provide a stable representation of the current degree of motion in the scene described by the video stream.

Once the motion vectors are determined at step S302, a motion value representing the overall level of motion for each video frame of the compressed video input is calculated at step S304, based on the derived/extracted motion vectors. As a non-limiting example, the motion value may be calculated by summing the derived/extracted motion vectors magnitudes across macroblocks associated with a video frame in the compressed video input.

At step S306, the calculated motion value is scaled based on the resolution of corresponding frames in the received video input.

At step S308, the scaled motion value is smoothed over several frames prior to outputting the motion value at step S310 for subsequent processing.

Temporal filtering may also be used by the decoder 102 in step S308 to identify motion that is, e.g., of human origin rather than mechanical or electrical sources (e.g., flashing lights or graphics in the background); however, the present disclosure is not limited to incorporating such filtering.

Figure 4:
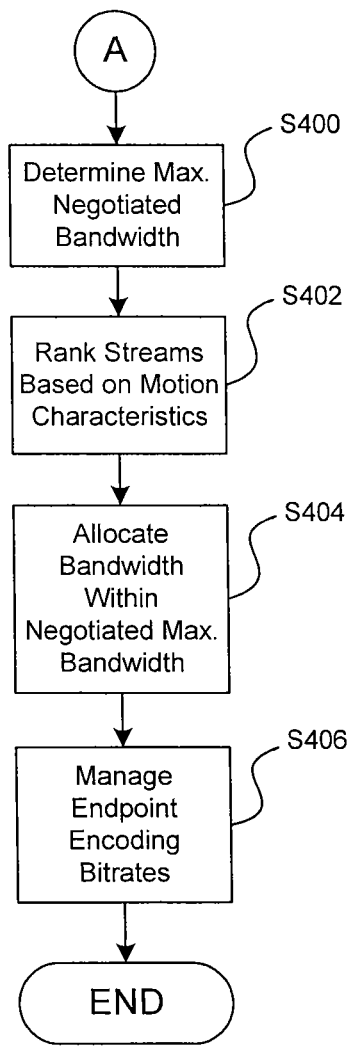
FIG. 4 illustrates an exemplary flow chart for bitrate management in a multipoint video conference.

Next, FIG. 4 illustrates an exemplary flow chart for bitrate management in a multipoint video conference.

At step S400, the bitrate management unit 206 determines the maximum negotiated bandwidth limit. The maximum negotiated bandwidth limit may be based on the processing capacity of the MCU 100, the number of endpoint streams received at the MCU 100, and the processing capability of the endpoints. The maximum negotiated bandwidth limit may be used in subsequent processing as a reference bitrate from which to allocate bandwidth amongst video conference endpoint streams. Further, the maximum negotiated bandwidth may provide a reference from which to base an allocation of a particular "important" stream's bandwidth. For instance, the most active stream often corresponds to the active speaker in a video conference. In this case, the bitrate management unit 206 may allocate bandwidth near the maximum negotiated bandwidth limit while providing relatively lower bitrates to the remaining streams.

At step S402, the bitrate management unit 206 ranks the received video conference endpoint streams based upon motion characteristics in the streams' content. The motion characteristics may be defined by the motion values described above with regard to FIG. 3, or may be defined by other methods. The ranking may be performed by creating an ordered list of streams based on the motion characteristics.

At step S404, the bitrate management unit 206 allocates bandwidth to the video conference endpoints based on the ranking of step S404. The bandwidth allocation may include a cost function that maximizes one or more streams' bitrates within the boundaries established by the maximum negotiated bandwidth limit. Alternatively, predetermined percentages of the maximum negotiated bandwidth may be assigned to the streams based on the motion level ranking of step S402.

At step S406, the MCU controller 200 manages the endpoint encoding bitrates based on the determined bandwidth allocation result.

Next, a hardware description of the MCU 100 according to exemplary embodiments is described with reference to FIG. 5. It should be appreciated that while an MCU is provided as a non-limiting example of hardware that can execute the features of the present disclosure, other hardware devices may be easily adapted to perform these features. For example, any general purpose computing device including a processor that executes instructions stored on a computer readable medium may be configured by one of ordinary skill in the art to execute the features of the present disclosure.

Figure 5:
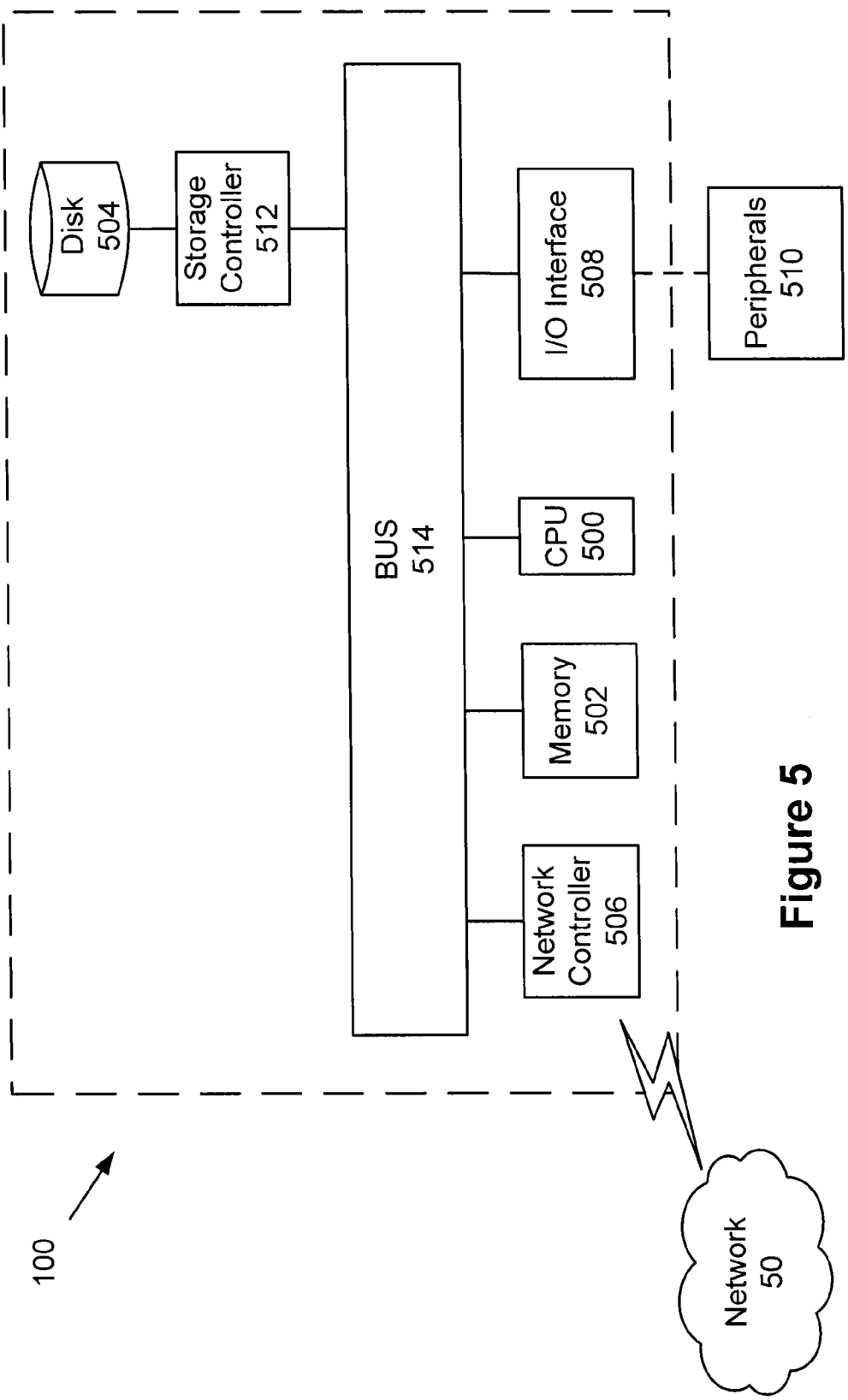
FIG. 5 illustrates an exemplary hardware embodiment of the present disclosure.

Turning to FIG. 5, the MCU 100 includes a CPU 500 which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the MCU 100 communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The MCU 100 in FIG. 5 also includes a network controller 506, such as an Intel Ethernet PRO network interface card from Intel Corporation of America, for interfacing with network 50. As can be appreciated, the network 50 can be a public network, such as the Internet, or a private network such as an LAN or WAN network, or any combination thereof and can also include PSTN or ISDN sub-networks. The network 50 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The MCU 100 further includes a general purpose I/O interface 508 that interfaces with a variety of peripherals 510, such as a display or keyboard.

The general purpose storage controller 512 connects the storage medium disk 504 with communication bus 514, which may be an ISA, EISA, VESA, PCI, or similar, for interconnecting all of the components of the MCU 10. A description of the general features and functionality of the peripherals 510, storage controller 512, network controller 506, and general purpose I/O interface 508 is omitted herein for brevity as these features are known.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

It must be noted that, as used in the specification and the appended claims, the singular forms "a," "an," and "the" include plural referents unless the context clearly dictates otherwise.

The invention claimed is:

1. An apparatus comprising:
 a memory that stores executable instructions; and
 a processor that executes the instructions in order to
 determine, for plural received compressed video inputs received from one or more endpoints in a video conference, at least one motion vector included in each of the plural compressed video inputs,
 calculate, based on the determined motion vectors, a motion value corresponding to each of the plural compressed video inputs, the motion values representing a level of motion over several frames for each of the plural compressed video inputs, and
 allocate, based on the calculated motion values, a portion of a maximum aggregate bandwidth to the each of the compressed video inputs based on the corresponding motion value, wherein the aggregate bandwidth is constant and a distribution of the bandwidth among the compressed video inputs is variable as a function of the motion values.

2. The apparatus of claim 1, wherein the processor determines a maximum negotiated bandwidth, and allocates portions of the maximum negotiated bandwidth to the one or more endpoints.

3. The apparatus of claim 2, wherein the processor allocates a highest portion of the maximum negotiated bandwidth to the endpoint, of the one or more endpoints in the video conference, having a highest magnitude calculated motion value.

4. The apparatus of claim 2, wherein the processor generates an ordered list of the motion values, the ordered list being based on relative magnitudes of the calculated motion values.

5. The apparatus of claim 4, wherein the processor allocates the portions of the maximum negotiated bandwidth to the one or more endpoints in the video conference based on the ordered list.

6. An apparatus comprising:
 a memory that stores executable instructions; and
 a processor that executes the instructions in order to:
 determine, for plural received compressed video inputs received from one or more endpoints in a video conference, at least one motion vector included in each of the plural compressed video inputs,
 calculate, based on the determined motion vectors, a motion value corresponding to each of the plural compressed video inputs, the motion values representing a level of motion over several frames for each of the plural compressed video inputs, and allocate, based on the calculated motion values, bandwidth to the one or more endpoints in the video conference, wherein the processor determines a maximum negotiated bandwidth, and allocates portions of the maximum negotiated bandwidth to the one or more endpoints, wherein the processor allocates the portions of the maximum negotiated bandwidth based on a cost function result, where a maximum boundary of the cost function is based on an encoding capacity of the one or more endpoints in the video conference and a number of concurrent video conferencing streams to be output.

7. A method comprising:

determining, by a processor for plural received compressed video inputs received from one or more endpoints in a video conference, at least one motion vector included in each of the plural compressed video inputs;

calculating, by the processor based on the determined motion vectors, a motion value corresponding to each of the plural compressed video inputs, the motion values representing a level of motion over several frames for each of the plural compressed video inputs; and allocating, by the processor based on the calculated motion values, bandwidth to the one or more endpoints in the video conference based on a cost function result, where a maximum boundary of the cost function is based on an encoding capacity of the one or more endpoints in the video conference and a number of concurrent video conferencing streams to be output.

8. The method of claim 7, wherein the processor determines a maximum negotiated bandwidth, and allocates portions of the maximum negotiated bandwidth to the one or more endpoints.

9. The method of claim 8, wherein the processor allocates a highest portion of the maximum negotiated bandwidth to the endpoint, of the one or more endpoints in the video conference, having a highest magnitude calculated motion value.

10. The method of claim 8, wherein the processor generates an ordered list of the motion values, the ordered list being based on relative magnitudes of the calculated motion values.

11. The method of claim 10, wherein the processor allocates the portions of the maximum negotiated bandwidth to the one or more endpoints in the video conference based on the ordered list.

12. A non-transitory computer readable medium having instructions stored therein that when executed by a processor causes a computer to execute a method comprising:

determining, for plural received compressed video inputs received from one or more endpoints in a video conference, at least one motion vector included in each of the plural compressed video inputs;

calculating, based on the determined motion vectors, a motion value corresponding to each of the plural compressed video inputs, the motion values representing a level of motion over several frames for each of the plural compressed video inputs; and allocating, based on the calculated motion values, bandwidth to the one or more endpoints in the video conference based on a cost function result, where a maximum boundary of the cost function is based on an encoding capacity of the one or more endpoints in the video conference and a number of concurrent video conferencing streams to be output.

13. The non-transitory computer readable medium of claim 12, wherein a maximum aggregate bandwidth is allocated to the endpoints of the video conference based on the motion values.

14. The apparatus of claim 1, wherein the processor is configured to rank a plurality of streams based on the motion values.

15. The apparatus of claim 1, wherein the processor is configured to identify a frame without a corresponding motion vector and calculate a predictive value for the frame based on neighboring frames.

\* \* \* \* \*